United States Patent [19]

Nishiyama et al.

[11] Patent Number: 4,841,371

[45] Date of Patent: Jun. 20, 1989

[54] APPARATUS FOR RECORDING CRT IMAGE

[75] Inventors: Mikio Nishiyama; Tatsuo Yoshino; Taizo Akimoto, all of Kanagawa, Japan

[73] Assignee: Fuji Photo Film Co., Ltd., Kanagawa, Japan

[21] Appl. No.: 95,502

[22] Filed: Sep. 11, 1987

[30] Foreign Application Priority Data

Sep. 11, 1986 [JP] Japan .................................. 61-214915

[51] Int. Cl.$^4$ ............................................. H04N 5/04
[52] U.S. Cl. ...................................... 358/244; 358/77; 358/180; 358/332; 358/345
[58] Field of Search .................. 358/77, 180, 244, 332, 358/345; 355/20

[56] References Cited

U.S. PATENT DOCUMENTS

| 4,096,530 | 6/1978 | Plugge et al. ................... 358/111 X |
| 4,360,805 | 11/1982 | Andrews et al. ................ 358/244 X |
| 4,482,919 | 11/1984 | Alston et al. ................... 358/244 X |
| 4,729,032 | 3/1988 | Nishiyama et al. ................. 358/244 |

FOREIGN PATENT DOCUMENTS

| 1027884 | 11/1963 | United Kingdom . |
| 1116882 | 6/1968 | United Kingdom . |
| 2139456 | 11/1984 | United Kingdom . |

OTHER PUBLICATIONS

Patent Abstracts of Japan, vol. 6, No. 28 (E-95)[906], Feb. 19, 1982.
Patent Abstracts of Japan, vol. 10, No. 175 (E-413[2231], Jun. 20, 1986.
Instruments and Experimental Techniques, No. 1, Jan.-/Feb. 1970, p. 184.
Wireless World, vol. 78, No. 1440, Jun. 1972, pp. 290-293; R. E. Knight et al, "Photographing Television Pictures", p. 291, Pharagraph 3, FIG. 3.
Patent Abstracts of Japan, vol. 3, No. 90 (E-127), Jul. 31, 1979, pp. 81 E 127.
British Kinematography Sound and Television Society Journal, vol. 1, No. 4, Apr. 1986, London, GB, R. Knight "Stills Photography of Television Images Part I", pp. 180, 181.
Patent Abstracts of Japan, vol. 7, No. 27 (E-156)[1172], Feb. 3, 1983.
"Multi-Imager 7", Matrix Instruments, Inc., printed Jun. 1983, Part No. 20-21-0051.
Applied Radiology, Jan./Feb. 1982, "Multiformat Cameras for the Production of Hard Copy from Digital Radiographic Systems", Ernest W. Edmonds, David M. Hynes, Dennis Baranoski, and John Rowlands.

Primary Examiner—James B. Mullins
Attorney, Agent, or Firm—Sughrue, Mion, Zinn, Macpeak and Seas

[57] ABSTRACT

A CRT image recording apparatus in which a picture a CRT image displayed on a CRT is photographed by a camera. In this apparatus, the number of vertical synchronizing signals separated from a video signal is counted, and the exposure time during which the CRT image is photographed is determined so as to correspond to the number of vertical synchronizing signals $2^K \cdot n$ (where K and n are integers) thereby counted. The exposure time is therefore determined is synchronism with the vertical synchronizing signals, thereby preventing any nonuniformity of exposure from occurring on a film.

21 Claims, 6 Drawing Sheets

APPARATUS FOR RECORDING CRT IMAGE

BACKGROUND OF THE INVENTION

This invention relates to an apparatus for recording CRT image and, more particularly, to a CRT image apparatus which is designed so as to uniform exposure on a film when a CRT image is photographed.

Traditionally, an apparatus which allows optical images displayed on the CRT of a video monitor to be observed and the optical CRT images to be recorded b photographing on the film as desired is used in X-ray CT (Computer Tomography) systems for medical use. A camera having a mechanical shutter has been used to photograph a CRT image in such an apparatus. However, it is necessary in this case to place the camera in the vicinity of the CRT screen to photograph the CRT image. This causes a problem in that the raster scanning lines of the CRT image are photographed and, hence, the finished photograph is difficult to inspect for diagnostic purpose. To cope with this problem, techniques of increasing the number of scanning lines and obscuring the scanning lines by shifting them in the vertical direction (hereinafter referred to as "raster erase") have been used.

However, if an image displayed on the CRT of the video monitor, in which the raster erase has been performed, i.e., the scanning lines have been shifted, is photographed by a camera having a mechanical shutter, it may result in that the shutter closes before the scanning of one frame of the image is completed during exposure on the film, thereby causing local variations (nonuniformity) in the density of the photograph due to nonuniformity of exposure. To prevent this nonuniformity of exposure, increased exposure time may be required.

That is, if scanning has been performed up to an intermediate portion of the CRT screen, and if the number of times of scan in the area of the CRT screen, a difference in an optical density of the exposed and developed film (photograph) $\Delta D$ is represented by the Equation:

$$\Delta D \approx 0.43 \cdot \gamma \cdot \frac{N - (N - 1)}{N} \quad (1)$$

where $\gamma$ represents the $\gamma$ value of the film used for photographing the CRT image, and is usually about 3.

Since the difference in the density which can be distinguished by eyes is at least 0.01, $N=129$ is obtained from Equation (1). The exposure time is usually about 2 seconds, so, if the CRT image is photographed for this time interval, N becomes less than 129, thereby causing local variations in density of the photograph due to nonuniformity of exposure. The time which corresponds to $N=129$ is about 17 seconds (If an 8-times raster erase is performed at a scanning rate of 528/60 Hz), resulting in an extension of the exposure time.

To prevent these local variations in density of the photograph due to the unevenness of exposure, one possible method involves opening and closing the shutter of the camera in synchronism with the frame of the CRT image. However, if the mechanical shutter is used for exposure on a film, as in the case of a conventional system, the CRT image is partially shaded by the shutter blades of the shutter as the shutter opens and closes. Therefore, it is difficult to completely eliminate the local variations due to the nonuniformity of exposure.

SUMMARY OF THE INVENTION

The present invention has been achieved with a view to overcoming the above-described problems, and an object of the present invention is to provide an apparatus for recording CRT image capable of preventing any local variations in density of the photograph caused due to the nonuniformity of exposure, without increasing the exposure time, when a CRT image is photographed.

To this end, the present invention provides an apparatus for recording CRT image having: vertical synchronizing signal separating means for separating vertical synchronizing signals from a video signal; counter means for counting the number of the vertical synchronizing signals; raster erase means for obscuring the scanning lines of a CRT image; and control means for controlling the exposure time during which the CRT image is recorded, the control means controlling the exposure time so that, if K and n are integers and if the number of vertical synchronizing signals is represented by $2^k \cdot n$, the exposure time corresponds to $2^k \cdot n$.

In accordance with the present invention, vertical synchronizing signals are separated from a video signal. Examples of vertical synchronizing signals are vertical synchronizing pulses used for shifting the raster scanning line from the lowermost position to the uppermost position on the CRT screen, and fly-back line erasing signals (blanking signals) used for erasing the scanning line (fly-back line) generated when the scanning line is shifted from the lowermost position to the uppermost position on the CRT screen. The scanning position shifting means is constituted so as to shift the scanning position of the CRT image in the vertical direction at constant intervals, thereby effecting raster erase. Examples of methods of performing raster erase are a method of delaying the vertical synchronizing pulses and a method of changing the voltage of a saw-tooth wave for effecting vertical scanning. To delay the vertical synchronizing pulses, the time for which the vertical synchronizing pulses are delayed is increased either sequentially or randomly. To change the voltage of the saw-tooth wave, the value by which the voltage is increased is increased either successively or randomly. The effect of this raster erase is such that the scanning position on the CRT screen is shifted at regular intervals in the vertical direction and the raster is also shifted in the vertical direction so that the scanning lines cannot be seen on the photograph. The counter means counts the number of vertical synchronizing signals while the raster erase is being performed in the above-described manner. The control means controls the exposure time so that the exposure time corresponds to the number of vertical synchronizing signals $2^k \cdot n$ (where K and n are integers).

The method of scanning used may be interlace scanning in which one complete frame is created by scanning two fields or non-interlace scanning in which one frame is provided by scanning one field. The optimum value of K is selected in accordance with the number of scanning lines. For example, for a CRT having a scanning rate of 525/60 Hz, $K=3$ is selected; and for a CRT having a scanning rate of 1125/60 Hz, $K=2$ is selected. Accordingly, if $K=1$, there are two possibilities: one in which one frame is displayed as two fields (interlacing); and one in which one frame is scanned twice by shifting the scanning lines in the vertical direction (non-interlacing). If $K=2$, four fields, enough for two frames, are displayed (interlacing), or four frames are displayed by shifting the scanning lines. If K=3, eight fields, enough for four frames, are displayed by shifting scanning lines, or eight frames are displayed by shifting the scanning lines.

In accordance with the present invention, as described above, the scanning position of a CRT image is shifted in the vertical direction in order to determine the exposure time in synchronism with the vertical synchronizing signals, so that the exposure time is determined in accordance with a value obtained by multiplying the number of the raster lines (raster erase $2^k$) by an integer (n), thereby preventing any nonuniformity of exposure from occurring.

BRIEF DESCRIPTION OF THE DRAWINGS

FIGS. 4(1) and 4(2) are diagrams of the state of change of a scanning line when an 8-times raster erase is effected;

DESCRIPTION OF THE PREFERRED EMBODIMENT

Figure 1:
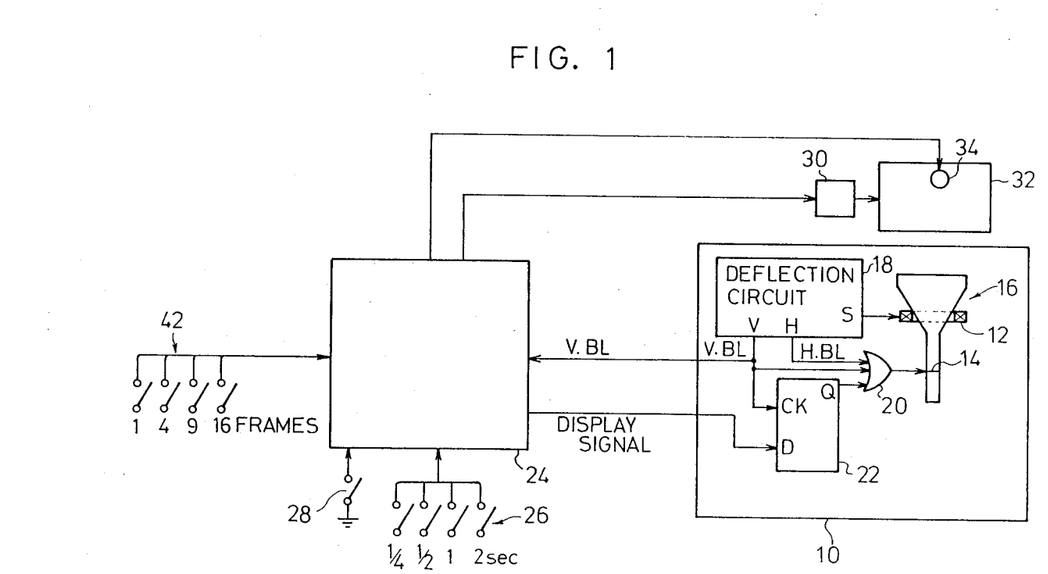
FIG. 1 is a block diagram of an embodiment of the present invention.

An embodiment of the present invention will be described in detail with reference to the accompanying drawings. Referring first to FIG. 1 which shows a block diagram of an embodiment of the present invention, a CRT 16 which has a deflecting coil 12 constituted by a vertical deflection coil and a horizontal deflection coil, and a cathode 14 is disposed in a TV monitor 00. A deflection circuit 18 has a terminal S through which a saw-tooth wave current for performing vertical scanning and a saw-tooth current for performing horizontal scanning are output, a terminal V through which a vertical blanking signal V-BL for preventing any electron beam from being emitted during a fly-back period of time is output, and a terminal H through which a horizontal blanking signal H-BL for preventing any electron beam from being emitted during a horizontal-direction fly-back period of time is output. The terminal S of the deflection circuit 18 is connected to the deflecting coil 12 so that saw-tooth wave currents are supplied to the vertical and horizontal deflection coils. The terminal H of the deflection circuit 18 is connected to the cathode 14 of the CRT 16 via an OR circuit 20, and the terminal V of the deflection circuit 18 is connected to the cathode 14 of the CRT 16, to a clock terminal CK of a D-flip-flop 22 and to an input port of a control circuit 24 which is constituted by a microcomputer. A terminal Q of the D-flip-flop 22 is connected to the cathode 14 of the CRT 16 via the OR circuit 20.

An exposure control switch 26 which has four terminals for controlling exposure time is connected to the control circuit 24, and an exposure start switch 28 which is turned on at the time of commencement of exposure, and a format switch 42 for selecting the size of the frame of a CRT image so as to change the image magnification in accordance with the size selected are also connected to the control circuit 26. An output port of the control circuit 24 is connected to a shutter mechanism of a camera 32 via a shutter operating solenoid 30, to a certification lamp 34 of the camera 32 and to a terminal D of the D-flip-flop 22 so as to supply display signals.

Figure 2:
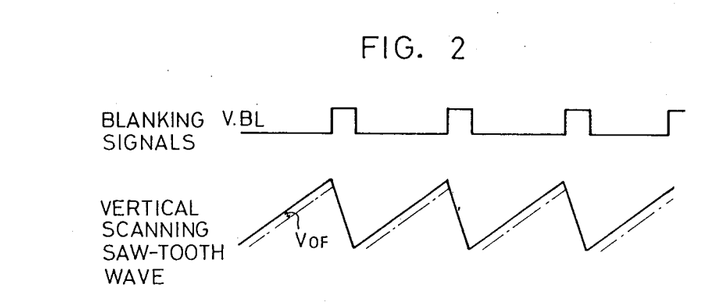
FIG. 2 is a diagram of the relationship between blanking signals and a vertical scanning saw-tooth wave.
Figure 3:
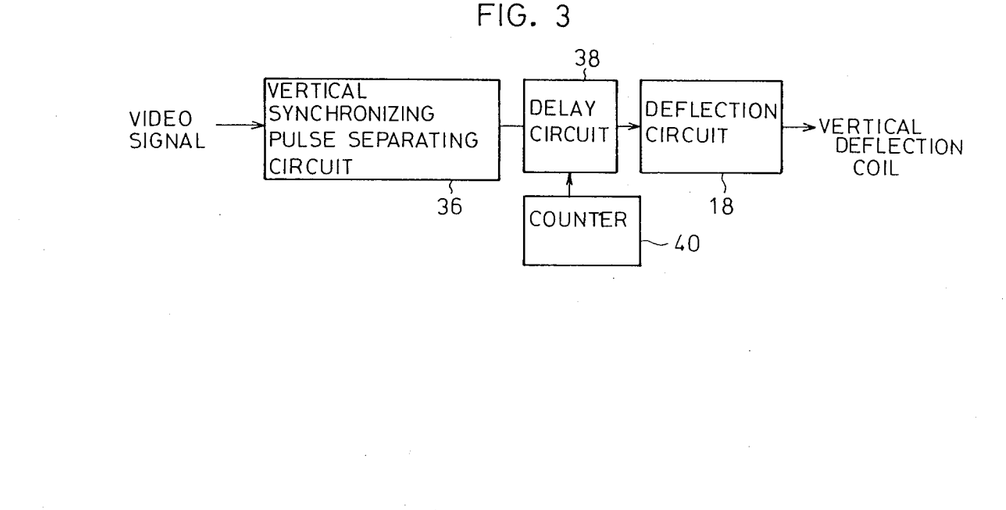
FIG. 3 is a block diagram of circuits which effect raster erase by delaying vertical synchronizing pulses.
Figure 4:
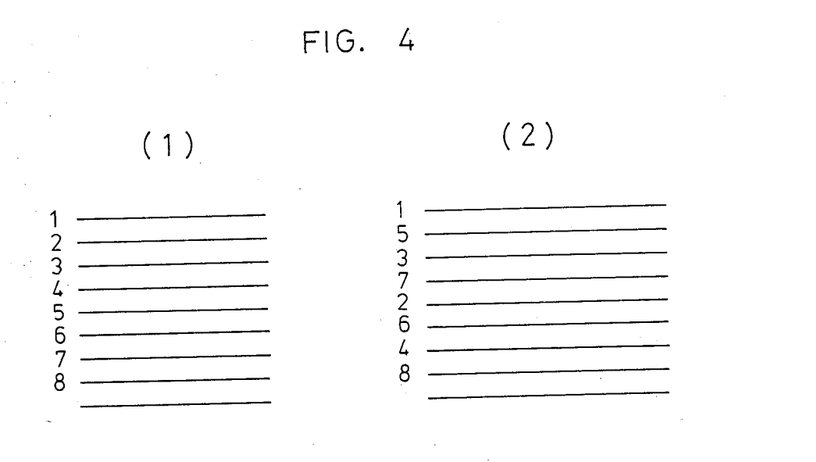

The manner of the raster erase will now be described below with reference to FIGS. 2 and 3. It will be described in this case with respect to a raster erase in a CRT which performs non-interlace scanning of K=3 at a scanning rate of 524/60 Hz. However, the raster erase can be performed in the same manner with respect to CRTs having scanning rates of 940/60 Hz and 1125/60 Hz by optimizing the value of K. Also, in the case of interlace scanning, it is possible to perform the raster erase by shifting the scanning line every two fields, namely, every frame. FIG. 2 shows the relationship between vertical blanking signals V-BL and a vertical scanning saw-tooth wave. If an offset voltage $V_{OF}$ is applied to this vertical scanning saw-tooth wave, the uppermost scanning start position on the frame in the CRT display is shifted in the vertical direction, thereby enabling the scanning position to be shifted in the vertical direction. It is therefore possible to shift the scanning line in the vertical direction to predetermined extents by repeatingly stepping up the offset voltage $V_{OF}$ by a predetermined level, that is, by successively setting this voltage to 0, 1 V, 2 V, 3 V, ... 7 V. FIG. 4(1) shows the state of shifting of the scanning line in non-interlace scanning in which the offset voltage $V_{OF}$ is successively increased by a predetermined level so as to multiply the number of scanning lines by 8. Numerals attached at the left hand side of the figure indicate the order of scanning. It is also possible to randomly shift the scanning line in the vertical direction by randomly stepping up the offset voltage $V_{OF}$ by setting predetermined levels such as 0, 4 V, 2 V, 6 V, 1 V, 5 V, 3 V and 7 V and repeating this process. FIG. 4(2) shows the state of shifting of the scanning line in non-interlace scanning when the offset voltage $V_{OF}$ is randomly increased so as to multiply the number of scanning lines by 8. Numerals attached at the left hand side of the figure indicate the order of scanning. The uppermost scanning start point on the frame in the CRT display may be shifted by separating vertical synchronizing pulses from the video signal by a vertical synchronizing pulse separating circuit 36, delaying these pulses by a delay circuit 38 for a period of time set by a counter 40, and thereafter supplying these pulses to the vertical deflection coil of the deflecting coil 12 via the deflection circuit 18, as shown in FIG. 3, so that the scanning line can be shifted substantially in the vertical direction. That is, it is possible to shift the scanning line in the vertical direction to predetermined extents in the same manner as that shown in FIG. 4(1) by periodically supplying, from the counter 40 to the delay circuit 38, count values which are successively increased by a predetermined rate, for example, 0, 8 μs, 16 μs, 24 μs, ... 56 μs so that the vertical synchronizing pulses are successively delayed for a predetermined period of time by the delay circuit 38. The above exemplified value: 8 μs can be obtained by dividing the period of time for scanning in the horizontal direction by the number to which one scanning line is multiplied (in the above case, 8). It is also possible to randomly shift the scanning line in the vertical direction in the same manner as that shown in FIG. 4(2) by periodically supplying, from the counter 40 to the delay circuit 38, count values which change randomly, for example, 0, 32 μs, 16 μs, 48 μs, 8 μs, 40 μs, 24 μs and 56 μs so as to delay the vertical synchronizing pulses.

Figure 5:
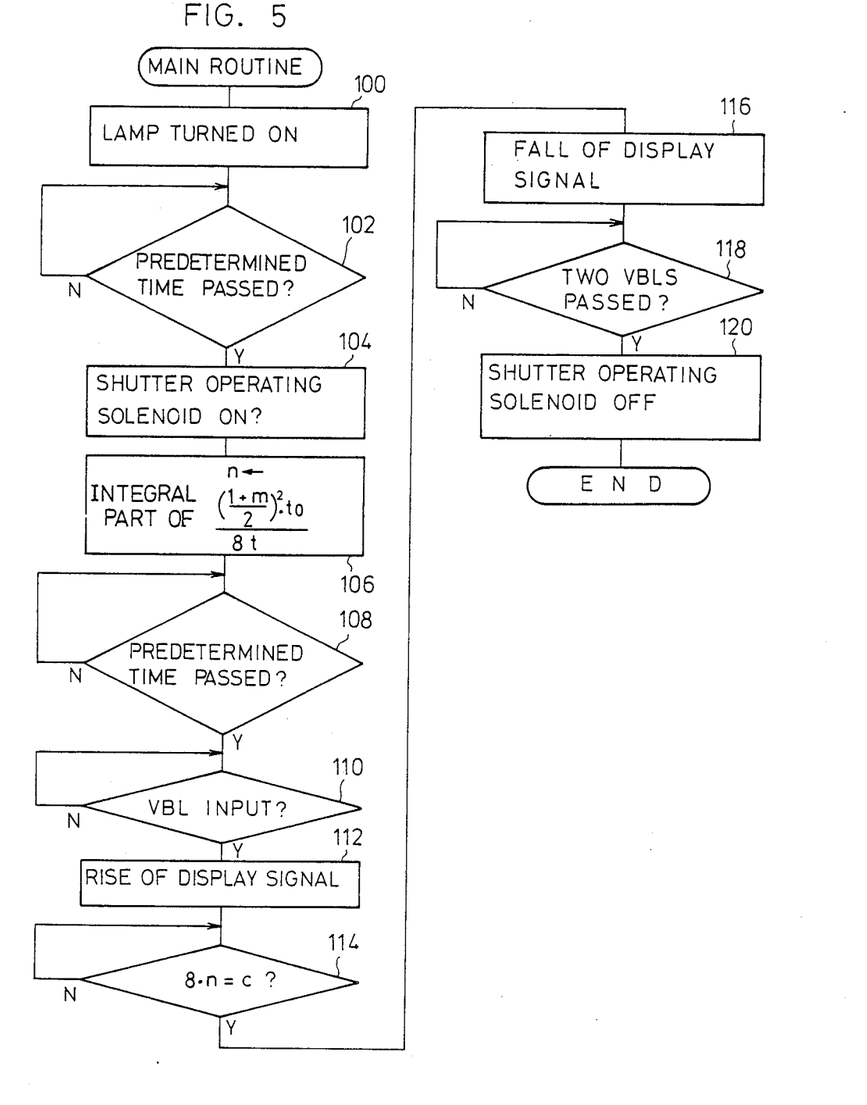
FIG. 5 is a flow chart of a main routine in accordance with the present invention.

The operation of this embodiment in which an image is displayed on the CRT after being processed by raster erase in the above-described manner and is photographed by the camera will now be described below. FIG. 5 shows a main routine which is executed when the exposure start switch 28 is changed over from the off state to the on state and in which a lamp 34 is lighted in Step 100 to indicate the commencement of photography when the exposure start switch 28 is changed over from the off state to the on state. Then, in Step 102, whether or not a predetermined period of time has passed is judged. If Yes, the shutter operating solenoid 30 is energized in Step 104 to make the shutter mechanism operate. If the CRT has been brightened within the above predetermined period of time, it is then extinguished. Normally, this shutter mechanism is opened completely in an operating time of about 50 to 100 ms. Next, in Step 106, the operation of the following formula which is shown below is performed, and the integral part of it is used as a value of n:

$$n \leftarrow \left[\frac{1+m}{2}\right]^2 \cdot \text{Integral part of } t_0/8t$$

where m is the image magnification represented by the size of film frame / the size of the monitor frame, is usually 0.8 to 4 and is determined by the state of the format switch 42; $t_0$ is a usual exposure time under the condition of m=1; and t is the time corresponding to one field. The brightness and the contrast of the CRT are maintained so as to be constant. If the scanning is performed in an interlaced scanning manner at a scanning rate of 525/60 Hz, t=1/60 is obtained.

Figure 6:
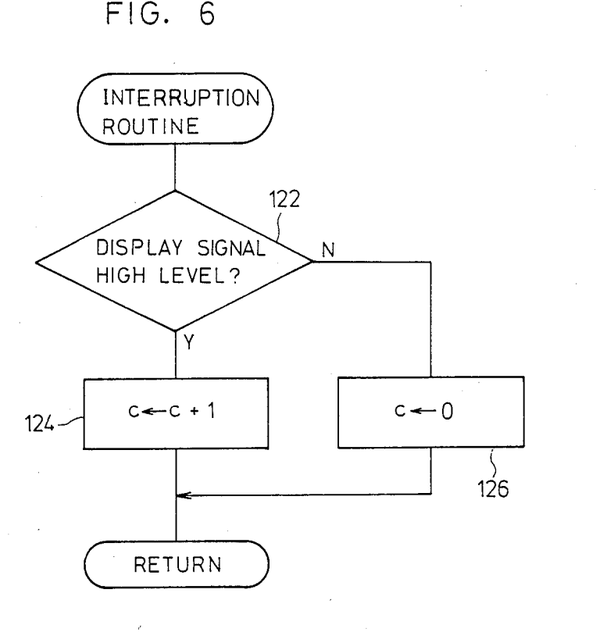
FIG. 6 is a flow chart of an interrupt control routine in accordance with the present invention.

In Step 108, whether or not a predetermined period of time (e.g., 500 ms) has passed is judged, considering a margin time in which the shutter is opened completely. If Yes, whether or not a vertical blanking signal V-BL has been input is judged in Step 110. If it is judged that the vertical blanking signal V-BL has been input, a display signal is raised in Step 112, and whether or not 8n=C is effected is judged in Step 114. C represents the count value counted by an interruption routine which is shown in FIG. 6 and which interrupts each time a vertical blanking signal V-BL rises. In Step 122, whether or not the display signal is high level is judged. If the display signal is high level, an increment is added to the count value C in Step 124. If the display signal is low level, the count value C is reset in Step 126 and the process returns to the main routine. As a result, the number of rises of vertical blanking signals V-BL or the number of vertical blanking signals V-BL is counted. If a value (8n) which is eight times greater than n which has been calculated in Step 106 is judged to be equal to the count value C which has been counted in Step 124, the display signal is made to fall in Step 116, and judgment is made in Step 118 as to whether or not two vertical blanking signals have passed. When they have passed, the shutter driving solenoid 30 is deenergized in Step 120.

Figure 7:
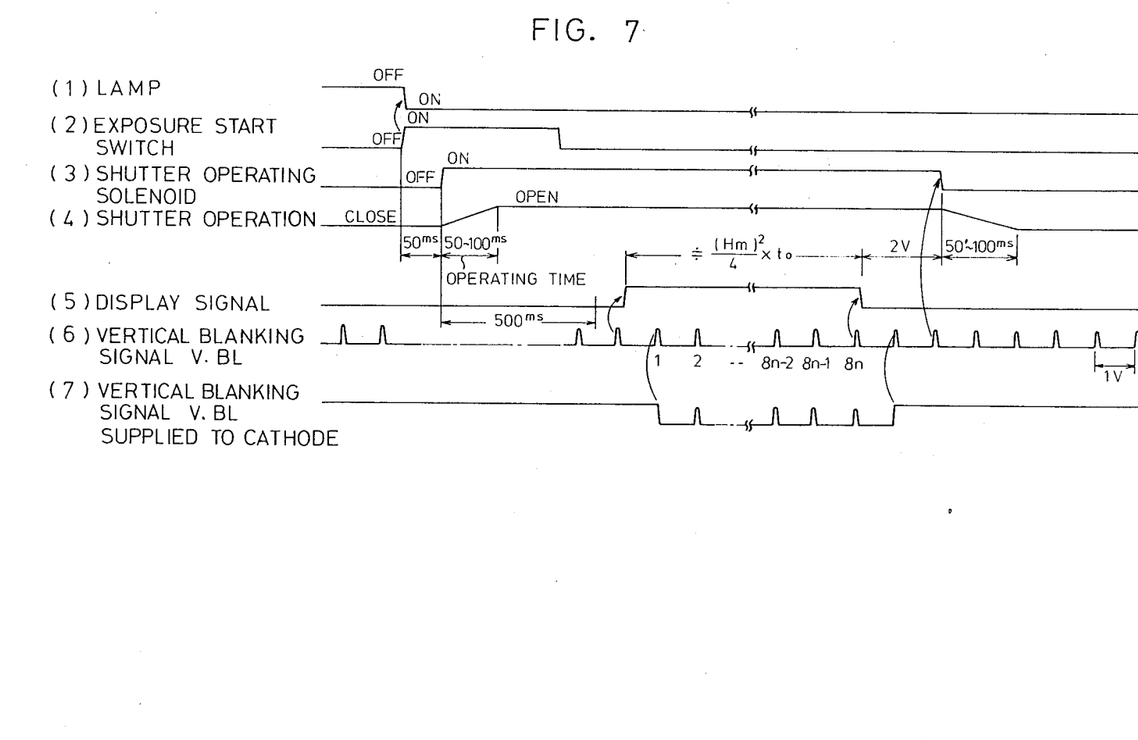
FIG. 7 is a diagram of waveforms at respective portions in accordance with the present invention.

FIG. 7 shows waveforms obtained at respective portions under the control which is effected in the above-described manner. As shown in FIG. 7, when a vertical blanking signals V-BL rises while the shutter is open, a display signal is output to and input into the D-flip-flop 22 through the terminal D thereof (FIG. 1). Since the clock terminal CK of the D-flip-flop 22 has been supplied with the vertical blanking signal supplied from the deflection circuit 18, a signal which is shown in FIG. 7 (7) is output from the D-flip-flop 22 through the terminal Q thereof and is supplied via the OR circuit 20 to the cathode 14. Accordingly, when the vertical blanking signal V-BL shown in FIG. 7(7) is low level, the image is displayed on the CRT 16 and, when the vertical blanking signal V-BL shown in FIG. 7(7) becomes high level, the display of the image on the CRT 16 is stopped. When an 8-th vertical blanking signal V-BL rises, the supply of the display signal is stopped, so that, at the next rise of a vertical blanking signal V-BL, the vertical blanking signal V-BL, which is supplied to the cathode 14, rises, as shown in FIG. 7(7), thereby terminating the display of the CRT image.

The present invention has been described in the above with respect to the case where K=3, but the optimum value of K is selected in accordance with the number of scanning lines. Since in the above-described case the CRT is brightened while the shutter is open, the shutter mechanism may be removed. The present invention has been described with respect to one example of exposure time control in which the exposure time is controlled by blanking signals, but the exposure time may be controlled by using a camera having a high-speed electronic shutter and controlling the electronic shutter on the basis of the vertical blanking signals while the CRT is being brightened.

What is claimed is:

1. An apparatus for recording CRT image by a recording device comprising:
   vertical synchronizing signal separating means for separating vertical synchronizing signals from a video signal;
   counter means for counting the number of said vertical synchronizing signals;
   raster erase means for obscuring the scanning lines of a CRT image; and
   control means for controlling the exposure time during which said CRT image is recorded by said recording device, said control means controlling said exposure time so that, if K and n are integers and if the number of said vertical synchronizing signals is represented by $2^k \times n$, said exposure time corresponds to $2^k \times n$.

2. An apparatus for recording CRT image according to claim 1, wherein said raster erase means shifts the scanning position of said CRT image in the vertical direction.

3. An apparatus for recording CRT image according to claim 2, wherein said raster erase means includes delay means for delaying said vertical synchronizing signals so as to shift said scanning position in the vertical direction at constant intervals.

4. An apparatus for recording CRT image according to claim 2, wherein said raster erase means includes voltage changing means for changing the voltage of a sawtooth wave for vertical scanning of said CRT image so as to shift said scanning position in the vertical direction at constant intervals.

5. An apparatus for recording CRT image according to claim 2, further comprising shutter means, wherein said shutter means is being opened during at least said exposure time.

6. An apparatus for recording CRT image according to claim 5, further comprising a camera, wherein said shutter means is mounted in said camera.

7. An apparatus for recording CRT image according to claim 2, wherein said control means is constituted to control said exposure time by terminating the display of said CRT image.

8. An apparatus for recording CRT image according to claim 1, wherein said vertical synchronizing signals include a vertical blanking signal for erasing a fly-back line.

9. An apparatus for recording CRT image according to claim 1, wherein said vertical synchronizing signals include vertical synchronizing pulses.

10. An apparatus for recording CRT image in which a CRT image displayed on a CRT is photographed by a camera, said apparatus comprising:
vertical synchronizing signal separating means for separating vertical synchronizing signals from a video signal;
counter means for counting the number of said vertical synchronizing signals separated by said separating means;
raster erase means for obscuring the scanning lines of said CRT image by shifting the scanning position of said CRT image in the vertical direction; and
control means for controlling the exposure time during which said CRT image is photographed by the camera, said control means controlling said exposure time so that, if the number of said vertical synchronizing signals counted by said counter means is represented by $2^k \times n$, where K and n are integers, said exposure time corresponds to $2^k \times n$.

11. An apparatus for recording CRT image according to claim 10, wherein said raster erase means includes a delay circuit for delaying said vertical synchronizing signals.

12. An apparatus for recording CRT image according to claim 11, wherein said delay circuit is constituted to increase the delay time of said vertical synchronizing signals sequentially.

13. An apparatus for recording CRT image according to claim 11, wherein said delay circuit is constituted to increase the delay time of said vertical synchronizing signals randomly.

14. An apparatus for recording CRT image according to claim 10, wherein said raster erase means includes voltage changing means for changing the voltage of a saw-tooth wave for vertical scanning of said CRT image.

15. An apparatus for recording CRT image according to claim 14, wherein said voltage changing means is constituted to increase said voltage sequentially.

16. An apparatus for recording CRT image according to claim 14, wherein said voltage changing means is constituted to increase said voltage randomly.

17. An apparatus for recording CRT image according to claim 10, wherein said vertical synchronizing signals include a vertical blanking signal for erasing a fly-back line.

18. An apparatus for recording CRT image according to claim 10, wherein said vertical synchronizing signals include vertical synchronizing pulses.

19. An apparatus for recording CRT image according to claim 10, further comprising a high-speed electronic shutter, wherein said control means is constituted to control said exposure time by opening and closing said high-speed electronic shutter in synchronism with said vertical blanking signals.

20. An apparatus for recording CRT image according to claim 19, wherein said high-speed electronic shutter is mounted in said camera.

21. An apparatus for recording CRT image according to claim 10, wherein said control means is constituted to control said exposure time by terminating the display of said CRT image on said CRT.

* * * * *